United States Patent [19]

Twist et al.

[11] Patent Number: 4,630,848
[45] Date of Patent: Dec. 23, 1986

[54] RELEASABLE COUPLING FOR TUBES OR PIPES

[75] Inventors: Michael Twist, Manchester; Paul Mundy, Ashton-Under-Lyne, both of England

[73] Assignee: Hawke Cable Glands Limited, Lancashire, England

[21] Appl. No.: 739,041

[22] Filed: May 29, 1985

[30] Foreign Application Priority Data

Jun. 13, 1984 [GB] United Kingdom ................ 8415098

[51] Int. Cl.$^4$ ............................................. F16L 37/00
[52] U.S. Cl. .................................... 285/308; 285/315; 285/340
[58] Field of Search ................. 285/39, 340, 308, 104, 285/105, 315, 320, 319, 398

[56] References Cited

U.S. PATENT DOCUMENTS

| | | | |
|---|---|---|---|
| 3,454,290 | 7/1969 | Tairraz | 285/398 X |
| 3,591,205 | 7/1971 | Hamburg | 285/340 X |
| 3,837,687 | 9/1974 | Leonard | 285/340 X |
| 3,879,065 | 4/1975 | Kobayashi | 285/39 |
| 4,021,062 | 5/1977 | Mariaulle | 285/340 X |
| 4,123,090 | 10/1978 | Kotsakis et al. | 285/340 X |
| 4,440,424 | 4/1984 | Mode | 285/39 |
| 4,508,369 | 4/1985 | Mode | 285/39 |

FOREIGN PATENT DOCUMENTS 2368663  5/1978  France .......................... 285/39

Primary Examiner—Richard J. Scanlan, Jr.
Attorney, Agent, or Firm—Larson & Taylor

[57] ABSTRACT

A releasable tube coupling comprises a body providing a housing in which an annular seal and clamping ring are located and secured by a retainer and, a releaser slidably supported by the retainer for limited axial movement relative to the housing. The seal is of generally Z-section having outer and inner flanges connected by an inclined web convergent towards the inside of the housing. The clamping ring is mounted into the seal and has a plurality of spaced apart radially inwardly directed inclined teeth which overlie the web on the inner face of the seal for engagement with the outer surface of a tube received within the housing to retain the tube in the housing. The teeth are displaced away from the tube to permit axial withdrawal the tube on inwards movement of the releaser which acts on the teeth through the seal web.

7 Claims, 5 Drawing Figures

U.S. Patent   Dec. 23, 1986   Sheet 1 of 2   4,630,848
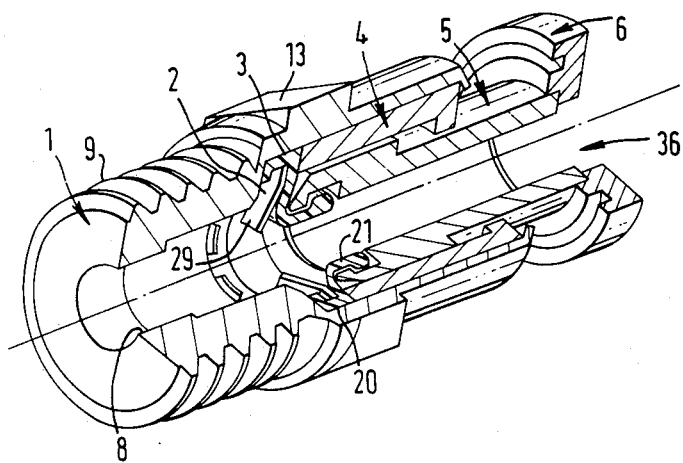
FIG. 1.
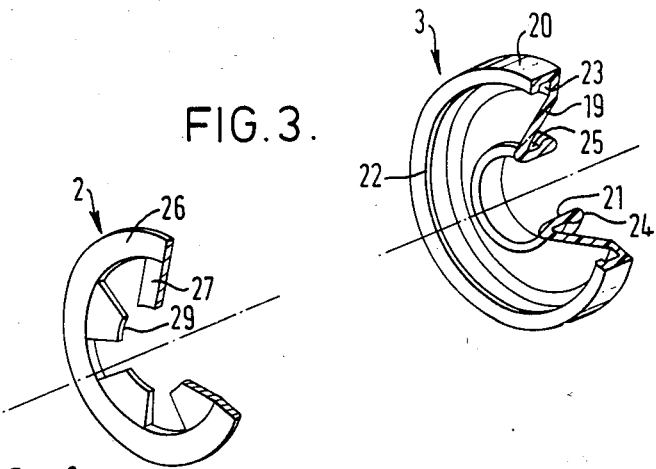
FIG. 3.
FIG. 4

RELEASABLE COUPLING FOR TUBES OR PIPES

BACKGROUND OF THE INVENTION

This invention relates to a releasable coupling for tubes or pipes. More particularly, but not exclusively, the invention concerns a coupling for use in fluid installations, such as hydraulic or pneumatic equipment, to provide a fluid-tight releasable connection between tubes or pipes and component parts or glands of the equipment.

The releasable coupling of this invention is of the kind, generally called a push-in coupling, in which the tube or pipe is inserted into an entry in the coupling and the tube or pipe is held within the coupling by a gripping or clamping action of claws or teeth engaging the exterior surface of the tube or pipe. For releasing the coupling, the teeth are displaced by some means or part or device acting thereon.

Various designs of such push-in couplings are known and many constructions are complex and expensive to manufacture. As will be understood, special requirements to ensure both a fluid-tight connection and the releasable engagement of the clamping teeth have to be provided, whilst providing a coupling which is compact and of relatively short axial length. In prior designs, the elements of the coupling for fulfilling the two functions of sealing and clamping displacement or disengagement are usually separated in the construction of the coupling assembly. This has led either to couplings of significant axial length or to couplings having complex configurations.

SUMMARY OF THE INVENTION

It is an object of this invention to provide a compact releasable coupling for tubes or pipes having a simple effective construction.

According to this invention, there is a releasable coupling for connecting a tube or pipe to a coupling body, the coupling providing a through bore with an entry for the tube and comprising a body providing a housing in which is received a seal and a clamping ring having a plurality of teeth for engagement with a tube received within the body; a retainer located in the housing to retain the seal and clamping ring therein; a releaser having an inner portion extending within the housing and an outer portion projecting from the body, the releaser being mounted and located by the retainer for limited axial movement relative to the body; the seal having a first outer annular portion engaging the housing, a second inner annular portion for engagement with the tube and a web extending between the first and second portions; the clamping ring being in located engagement with the first annular portion of the seal with the teeth projecting radially inwards and overlying the web on the face opposed to the releaser; the arrangement being such that in use with a tube received within the coupling on moving the releaser axially inwards of the entry, the releaser acts through the seal to displace the teeth away from the tube into a clearance in the housing thereby releasing the tube for axial withdrawal from the entry.

By this invented coupling, there is a seal which is designed to have outer and inner portions for respective sealing engagement with the housing in the body and with the tube. The seal locates and engages the clamping ring, and the seal web is adjacent to the teeth of the clamping ring. By this arrangement a compact design of short axial length is achieved whilst ensuring full fluid-tight sealing between the coupling body and the tube connected to the coupling. clearance in the housing into which the teeth may be displaced on releasing movement.

This arrangement of mounting and locating the clamping ring and seal enables simple assembly of the coupling and provides a compact arrangement.

The inner flange portion of the seal is preferably formed with a seal bead at it's free edge and the releaser is a sleeve having a nose portion located between the bead and the web.

By this feature, the releaser is located relative to the inner flange portion of the seal and retains this portion in the correct attitude for full sealing engagement and prevents radially outwards movement into the housing. The nose portion of the releaser engages the face of the web, and due to the annular form of the nose when axial pressure is applied to the releaser, the thrust is applied uniformly through the web to displace the teeth.

Conveniently, the clamping ring comprises a flat annular outer portion from which a series of spaced apart teeth project inwardly and inclined relative to the plane of the outer portion to extend in substantially the same convergence as the seal web.

This form of clamping ring with it's location and mounting within the body housing by the seal enables manufacturing tolerances to be accommodated.

The invented coupling may further comprise a tube support mounted within the body housing and having a tubular spigot over which the free end of a tube may be received to support the tube against inward collapse in the region of the seal and clamping ring.

By this arrangement, the invented coupling can be used with tubes of relatively thin wall thickness.

The seal is securely located in the housing against axial or rolling movement by the retaining sleeve engaging the outer seal portion and the inner seal portion lies closely adjacent to the teeth but nearer the entry and arranged so that the inner seal portion will engage the surface of the tube which has not been contacted by the teeth.

This invented coupling avoids the disadvantages of certain prior push-in couplings wherein the seal is subject to axial or rolling movement when the tube is inserted or released. Furthermore, the teeth are released from the tube by a simple axial movement avoiding rotation or turning of a coupling part relative to the tube and/or seal. Additionally, the releasing force is applied axially by the releaser acting through the seal web, and by only an axial thrust the teeth are spread apart to enable the tube to be released.

Preferably, the seal is of generally Z-shape having an outer flange portion connected by the web to an inner flange portion with the outer and inner flanges extending in opposed senses from the web and with the web converging away from the entry.

By this particular shape of seal, substantial axially extending sealing faces are provided to ensure fluid tightness as the outer flange portion seats on the housing providing an effective seal interface with the housing and the inner flange portion is for sealing engagement with the tube.

Conveniently, the outer flange portion of the seal has an inwardly directed groove in which the peripheral edge of the clamping ring is located with the extreme end face of the outer flange being located on a step in the body leading to a convergent face providing the Other features of this invented coupling and the advantages and merits thereof will be referred to later herein.

Exemplary embodiments of push-in coupling according to this invention will now be described with reference to the accompanying drawings wherein:

BRIEF DESCRIPTION OF THE DRAWINGS

FIG. 1 is an isometric partly sectioned view of the assembled coupling;

FIG. 3 is an enlarged detail and partly sectioned view of the coupling seal;

FIG. 4 is an enlarged detail and partly sectioned view of the clamping ring.

DETAILED DESCRIPTION OF THE EXEMPLARY EMBODIMENTS

Figure 2:
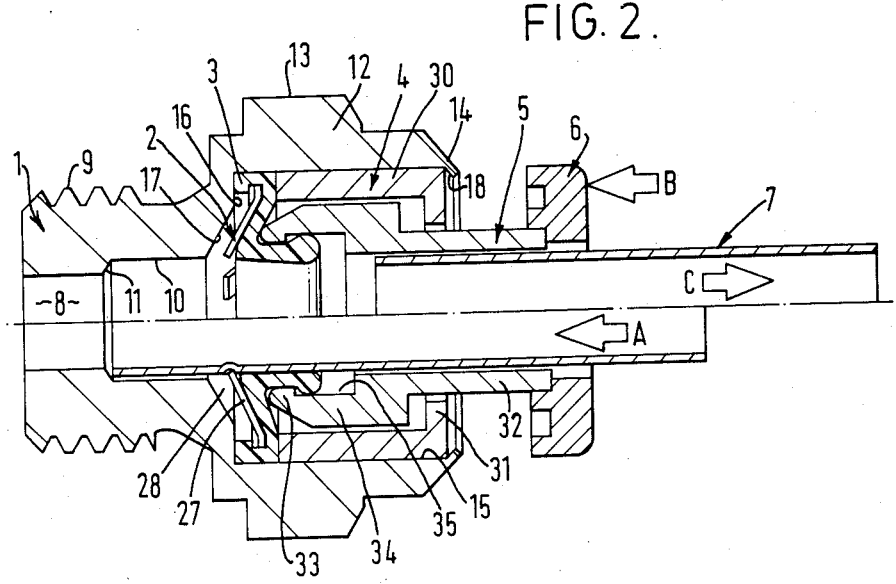
FIG. 2 is a longitudinal section of the assembled coupling depicting the operative positions in coupling a tube as shown below the centre-line and in releasing a tube as shown above the centre-line.

With reference to the drawings, the coupling has a through bore and comprises a body 1 in which are mounted a clamping ring 2, a seal 3 and a retainer 4, and located within the retainer 4 is the inner end of a releaser 5 which carries an end cap 6 on the outer end.

The coupling is intended to releasably connect a tube 7 to a conduit or pipe or gland (not shown) in a fluid (hydraulic or pneumatic) installation. The coupling depicted in FIGS. 1 to 4 is particularly suitable for use with tubes of semi-rigid plastics material but it may be used with metal tubes. An arrangement for use with thin-walled tube will be described later with reference to FIG. 5. The details of the conduit or the like or gland with which the coupling is to be used are not described as these are not within the scope of this invention and are not considered to be necessary to understand this invention.

With reference to the embodiment shown in FIGS. 1 to 4, the body 1 is hollow and made of metal or rigid material. One end is formed with a bore 8 and has an external thread 9 for connecting the coupling to a gland nut, bush or threaded block or the like (not shown) with the bore 8 aligned with the fluid line. A co-axial counterbore 10 extends inwardly from the bore 8 with an abutment shoulder 11 at the co-incidence of the bores. The diameters of the smaller bore 8 and the bore 10 are selected with respect to the diameter and wall thickness of the tube 7 so that the internal cross section of the fluid line is maintained substantially constant and the tube 7 is a sliding fit within the bore 10 with the abutment shoulder 11 providing a limit stop for abutting engagement with the end of the tube 7.

The body 1 has an intermediate enlarged boss 12 which is formed with six flats 13 for use with a tool in connecting or disconnecting the coupling to the gland nut or the like by means of the thread 9. The boss may have other configurations suitable, such as knurled or with a different number of flats.

The other end of the body beyond the boss 12 is cylindrical terminating in a frusto-conical end 14. This part of the body provides a housing 15 of generally cylindrical shape of which the inner end has an annular shoulder 16 from which extends a convergent face 17 tapering towards the bore 10. The outer end of the housing 15 is surrounded by an inwardly directed bead 18 contiguous with the frusto-conical end 14.

The seal 3 is of annular form with a section of generally Z-shape and is made of a suitable resilient and flexible material such as a rubber, plastics or elastomeric compound and the seal may have internal or integral stiffeners or reinforcements. The seal 3 has a central web 19 extending between an outer flange 20 and an inner flange 21. The free edge of the outer flange 20 is formed with an inwardly directed rib 22 which defines an annular channel or groove 23 between the rib 22 and the web 19. The free edge of the inner flange 21 terminates in a round seal bead 24 and an annular recess 25 extends between the web 19 and the bead 24. The free edges of the inner and outer flanges extend in opposed senses with the outer flange 20 being designed so that the rib 22 abuts the shoulder 16 of the housing 15.

The clamping ring 2 is made of resilient and strong metal or plastics. The ring 2 comprises a flat annular outer portion 26 from which a series of spaced apart teeth 27 project inwardly and inclined relative to the plane of the outer portion.

The clamping ring 2 is mounted into the seal 3 to provide a seal around the ring 2 itself whilst also providing a flexible location for the ring to give a degree of freedom for the movement required in the clamping action later described. In addition, by the use of the special form of seal 3 mounting the clamping ring 2, relatively wide tolerances on tube diameters can be achieved with a single size ring.

As best shown in FIG. 2, in the coupling assembly the clamping ring 2 is supported on the seal 3 with the periphery of the annular outer portion 26 being seated in the seal groove 23 whilst the teeth 27 lie closely adjacent and aligned with the seal web 19. There is a clearance 28 between the teeth 27 and the housing face 17 enabling axial displacement of the teeth 27 as will be explained later. The free ends 29 of the teeth 27 extend in the normal relaxed position to protrude radially inward of the bore 10 so as to engage and grip the outer wall of the tube 7 when inserted in the coupling.

The retainer 4 comprises a cylindrical sleeve 30 of metal or plastics having an inwardly directed outer flange 31. The retainer 4 is seated within the housing 15 and is located therein by the bead 18. The inner end of the sleeve 30 abuts the outer flange 20 of the seal to locate both the seal 3 and the clamping ring 2 within the coupling body 1.

The releaser 5 comprises an outer cylindrical portion 32 defining an axial throughway with clearance for the tube 7. The annular cap 6 is mounted on the outer end of the sleeve portion and the cap 6 may have a knurled or profiled configuration to assist gripping or manipulation. The cap 6 may be secured to the releaser 5 or releasibly mounted so that it can be pulled off. The cap 6 and/or the releaser 5 may be of plastics or metal.

The inner end of the releaser 5 is formed with a leading tapered nose 33 protruding axially from a peripheral annular flange 34 extending from the sleeve portion 32. The nose 33 is located in the recess 25 between the web 19 and seal bead 24 and retains the seal inner flange 21 in the correct attitude for full sealing engagement and prevents radially outwards movement into the housing.

The releaser 5 is mounted within the housing 15 for limited axial movement, and the flange 31 on the retainer 4 serves as an abutment engageable with the flange 34 to retain the releaser 5 within the housing.

In use of the coupling to connect the tube 7, the coupling releaser 5 provides an entry 36 into which the end of the tube is presented and pushed. As the end of the tube 7 is slid into this bore it first engages the seal bead 24 which is resiliently deformed radially outwards and is simultaneously subject to an axially directed force. The seal 3 is located against displacement axially by the nose 33 of the releaser 5 and as the tube 7 is advanced further, the end of the tube engages the free ends 29 of the teeth 27 so that the teeth are resiliently displaced towards the housing wall 17 and the tube can be forced past the teeth into the bore 10 until the end of the tube abuts on the shoulder 11.

In FIG. 2, this coupling movement of tube 7 is indicated by arrow A and the connected position is depicted in the lower section.

Once the end of the tube 7 abuts the shoulder 11, the ends 29 of the teeth 27 are not subject to any axial thrust and the teeth 27 revert to their inwardly projecting position so as to bite into or to tightly grip the tube around it's periphery. The external surface of the tube is in sealed engagement with the seal 3 for a fluid-tight connection.

The tube 7 is held rigidly in the coupling and cannot be inadvertently disconnected by pulling or twisting the tube. The teeth grip the tube and prevent outward displacement of the tube. If the tube were pulled outwardly, the effect would be to draw the teeth into tighter gripping engagement as the teeth would be subject to forces in an axial direction pulling the teeth towards the plane of the annular portion 26 and decreasing the effective diametric distance between the free ends of the teeth. If the cap 6 is secured to the releaser and pulled outwardly, the same effect of increasing the gripping or clamping action arises. If as preferred, the cap 6 is releasably mounted on the releaser 5 and pulled then it merely comes off avoiding any risk of inadvertent disconnection.

In order to release the tube from the coupling, all that is required is for the cap 6 to be pushed inwards in the direction of arrow B in FIG. 2. On such axial inward displacement of the cap 6 and the releaser 5, the nose 33 of the releaser acts on the web 19 of the seal 3 with the pressure exerted through the web acting on the teeth 27 to displace them into the clearance 17 to spread the teeth apart and to disengage them from the outer surface of the tube. Thus, once the teeth 27 are displaced, the tube can be withdrawn in the direction of arrow C in FIG. 2 from the entry 36 for disconnection.

Figure 5:
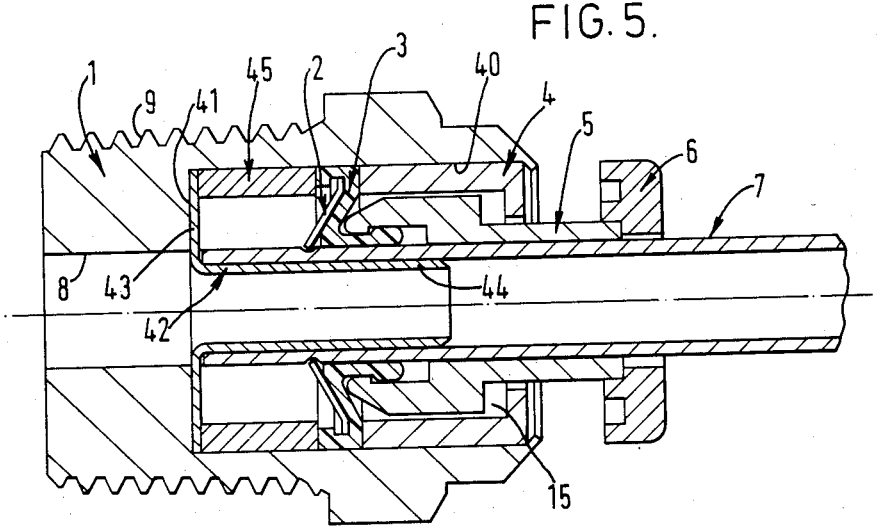
FIG. 5 is a longitudinal section of a coupling showing an arrangement for use with thin-walled tubes.

With reference to the arrangement of the invented coupling depicted in FIG. 5, this is particularly suitable for use with thin-walled tubes. The main components of this coupling are the same or similar to those described previously for the first embodiment and are not described again in detail. For convenience these same components are given the same reference numbers as the first embodiment.

The one end of the body 1 has the bore 8 and an external thread 9 for connecting the coupling to a threaded block or the like. The other end of the body has a counterbore 40 providing an internal shoulder 41 at the coincidence of the bores 8 and 40. The inside of the outer end portion of the body 1 provides the housing 15 for the clamping ring 2, and seal 3 and the releaser 5.

Within the inner portion of the bore 40 there is located a tube support 42 having a flange 43 seated on the shoulder 41 and a tubular spigot 44 of which the free end projects co-axially into the bore 10 towards the tube entry. A spacer sleeve 45 is seated in the bore 40 and extends between the outer margin of the flange 43 and the seal 3 and in the assembly locates the tube support 42 in the coupling.

As shown in the drawing of FIG. 5 the spigot 44 extends past the clamping ring 2 and the seal 3 with a diametric clearance. The tube 7 is of the thin-wall type and the free end is located on the spigot 44 and pushed over same when the tube 7 is connected to the coupling. The tube 7 is entered through the cap 6 and releaser 5 and slid in past the seal 3 and clamping ring 2 until it abuts the flange 43. As will be appreciated, the spigot 44 provides an internal support for the tube 7 to prevent collapse inwardly during connection and whilst the tube 7 is subject to the clamping and gripping action of the teeth of the clamping ring.

The coupling is used and functions in substantially the same manner as the first embodiment. The dimensions of the spigot 44 of the tube support 42 are selected with due regard to the wall thickness of the tube 7 to be fitted. The axial length of the spacer sleeve 45 is selected to ensure sufficient clearance for the displacement of the clamping ring teeth and it may be made of rigid plastics or metal. This arrangement has particular application for pneumatic or hydraulic pipes in automotive installations.

As will now be understood, the invented coupling is of particularly simple construction with the arrangement of the seal 3 and clamping ring 2 being designed to ensure a compact and effective seal whilst supporting the teeth for their operative movement for the release from the gripping or clamping engagement.

The outer annular flange 20 of the seal and the inner bead 24 with the contiguous web 19 provide a continuous fluid-tight seal between the body 1 and the tube 7. The web 19 of the seal 3 supports the teeth 29 and the axial thrust for displacing the teeth is applied through the web resulting in a uniform even pressure on the teeth for a smooth uncoupling movement. The seal is fixed in the housing both by the retainer and the clamping ring and the releaser, and due to the axial length of the inner flange 21 of the seal there is a significant area of sealing engagement between the seal and the tube 7.

This arrangement is an improvement over prior designs of certain push-in couplings in which the seal used is of the O-ring kind with limited sealing area and, in some designs which is also subject to rolling forces when engaged by the tube which tends to disturb the location and seating of the seal. In this invented arrangement, when the coupling is in use and subject to fluid pressure within the tube, the tube will expand and due to the flexibility of the seal the sealing effect is enhanced. In addition, the seal engages with a portion of the tube which has not been damaged by any prior engagement with the teeth.

As will also be appreciated, the embodiments just described are only exemplary of the invention. The coupling may be modified to provide a coupling for two or more tubes with the body having two or more housings opposed at angles to each other with each housing locating a respective seal and clamping ring with associated retainer and releaser. If desired, a further seal, such as an O-ring may be disposed in the body in bore 10 adjacent the shoulder 11.

The coupling may also be modified with respect to the retention of retainer within the body. Instead of an inwardly directed bead, as described for the exemplary embodiment, the retainer could be a force fit in the body housing or be retained by fastening devices such as barbs or screws. The dimensions and proportions of the component parts can be changed or selected for different design and tube or pipe applications.

We claim:

1. A releasable coupling for connecting a tube or pipe to a coupling body, said coupling providing a through bore with an entry for said tube and comprising a body providing a housing in which is received a seal of generally Z-shape in section and a clamping ring having a plurality of teeth for engagement with a tube received within the body, a retainer located in said housing to retain said seal and clamping ring therein, a releaser having an inner portion extending within said housing and an outer portion projecting from said body, said releaser being mounted and located by said retainer for limited axial movement relative to said body, said seal having a first outer annular flange portion engaging said housing, a second inner annular flange portion for engagement with said tube and said first and second flange portions extending in opposed senses, said seal having a web connected to and extending between said first and second flange portions with said web converging away from said entry, said clamping ring being in located engagement with said first flange portion of said seal with said teeth projecting radially inwards and overlying said web on the face opposed to said releaser, the arrangement being such that, in use with a tube received within said coupling, on moving said releaser axially inwards of said entry, said releaser acts through said seal to displace said teeth away from said tube into a clearance in said housing thereby releasing said tube for axial withdrawal from said entry.

2. A releasable coupling according to claim 1 wherein said outer flange portion has an inwardly directed groove in which the peripheral edge of said clamping ring is located.

3. A releasable coupling according to claim 1 wherein the extreme end face of said outer flange portion is located on a shoulder in said housing leading to said clearance in said housing in which said teeth may be displaced on releasing movement.

4. A releasable coupling according to claim 3 wherein said clearance is provided by a convergent face leading from said shoulder.

5. A releasable coupling according to claim 3 wherein said shoulder and clearance are provided by a spacer located within said housing.

6. A releasable coupling according to claim 1 wherein said inner flange portion has an outwardly directed recess and said releaser is a sleeve having a nose portion located in said recess.

7. A releasable coupling according to claim 1 wherein said clamping ring comprises a flat annular outer portion from which a series of spaced apart teeth project inwardly and are inclined relative to the plane of said outer portion to extend in substantially the same convergence as said web.

* * * * *